April 5, 1927.  J. DEMAND  1,623,308
WINDSHIELD WIPER
Filed June 7, 1921  2 Sheets-Sheet 1
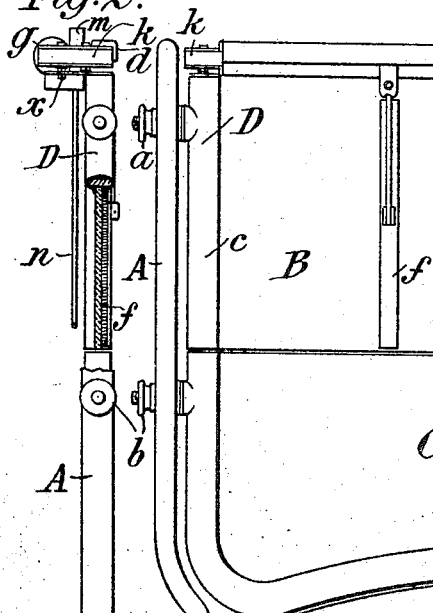
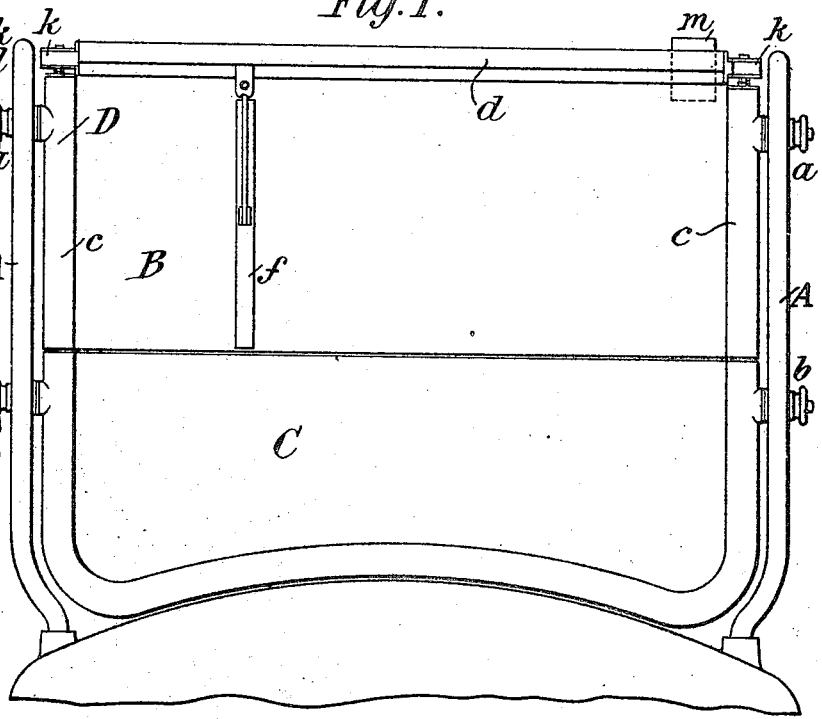
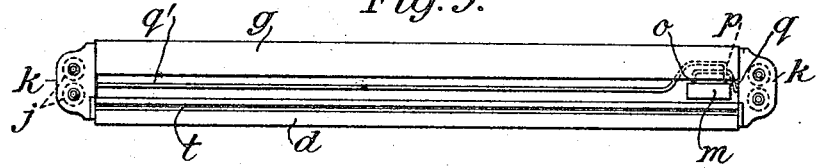
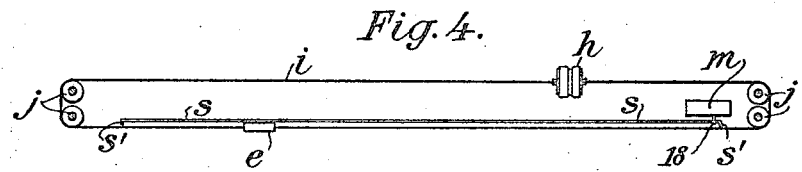
Inventor
Joseph Demand,
By his Attorneys
Fraser, Turk & Myers.

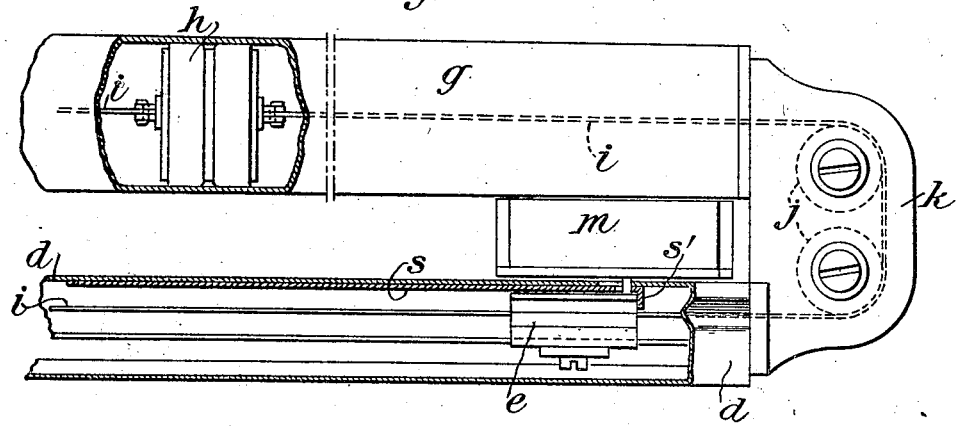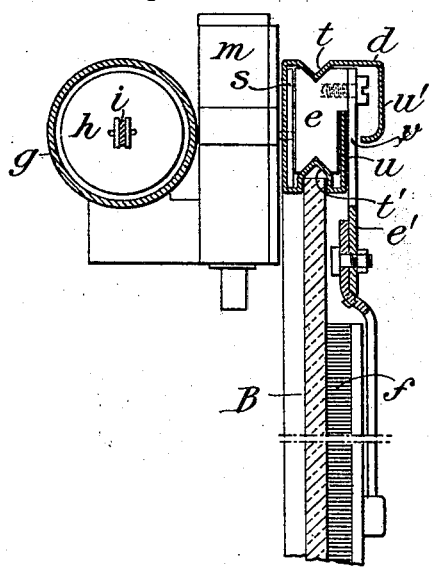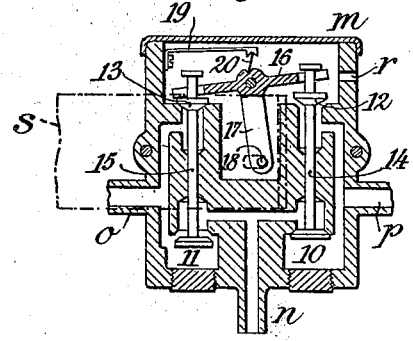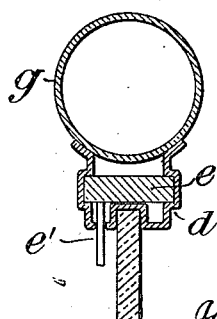

Patented Apr. 5, 1927.

1,623,308

UNITED STATES PATENT OFFICE.

JOSEPH DEMAND, OF NEW YORK, N. Y., ASSIGNOR, BY MESNE ASSIGNMENTS, TO ALL CLEAR WINDSHIELDS, INC., OF BOSTON, MASSACHUSETTS, A CORPORATION OF MASSACHUSETTS.

WINDSHIELD WIPER.

Application filed June 7, 1921. Serial No. 475,768.

This invention provides a self-contained wind shield and wind shield cleaner for automobiles or similar vehicles.

In my Patent No. 1,370,684, dated March 8, 1921, is set forth a construction of wind shield cleaner comprising a cylinder parallel with the wind shield, in which travels a piston, this piston being connected by a flexible connector passing over pulleys to a slide movable in guides parallel with the cylinder and carrying a wiper or cleaner for the wind shield; with valves for connecting the opposite ends of the cylinder alternately with the outer air, and with a suction pipe leading to the intake manifold of the engine (or to other source of fluid pressure or vacuum); the valve positions being automatically reversed at each end of the stroke of the piston and wiper. In my application filed February 23, 1921, Serial No. 447,070, is set forth an improved construction of wind shield cleaner wherein the cylinder and tubular guide for the slide or wiper carrier are arranged closely parallel as one integral structure which is adapted to be clamped or otherwise fastened to the wind shield frame; and including certain specific features of construction whereby to render the manufacture and application of such wind shield cleaners to existing cars convenient and practicable.

The present invention aims to provide a novel construction of wind shield whereby a wind shield cleaner of the character set forth in my said patent and application shall be as nearly as possible an integral or self-contained part of the wind shield itself, that is to say, of the wind shield frame. The present construction is best adapted for applying the cleaner to new wind shields being applied to new cars in the process of building them, as distinguished from applying the wind shield cleaner as an attachment to the wind shield on an existing car.

To this end the invention provides for making the cylinder and carrier guide integral with and as part of the wind shield frame, and forming as compact a portion thereof as possible, so that the existence of the cylinder shall be as nearly as possible imperceptible. In the preferred construction the upper or horizontal member of the wind shield frame is made hollow, its interior serving as the guide for the wiper carrier, which accordingly reciprocates longitudinally within this hollow frame member, and has an arm projecting out through a longitudinal slit or opening therein for carrying the wiper. The piston traveling in the cylinder, and the wiper carrier or slide, are connected, as before, by a flexible connector being preferably a thin metal ribbon passing over pulleys at the ends and traveling within the cylinder and tubular frame member. The valve mechanism is similar to that in my last-mentioned application, and is inconspicuously located in a space at one end between the frame member and cylinder.

As will be obvious the terms wind shield and wind shield cleaner are used in a broad sense to include any storm shield structure to keep out rain, snow, sleet, etc., and the means for clearing the shield of such obstructions to vision.

Referring to the drawings,—

Figure 1 is a front elevation of a wind shield embodying the present invention;

Fig. 2 is a side elevation thereof;

Fig. 3 is a plan thereof;

Fig. 4 is a plan showing the moving parts isolated from their enclosing and guiding parts;

Fig. 5 is a fragmentary plan view on a larger scale;

Fig. 6 is a transverse section;

Fig. 7 is a vertical section through the valve box, showing somewhat diagrammatically the valve construction and connections.

Fig. 8 is a sectional view through the cylinder and upper frame member of a modified form of the invention.

In Figures 1 and 2, A A are the usual uprights carrying the wind shield members B and C, which may be of any usual construction, their frames or sash preferably being pivotally hung to the uprights A A in any customary manner, as by pivots $a$ $a$, $b$ $b$. The wind shield cleaner is required only on the wind shield section B, which for convenience will be hereinafter referred to as the wind shield.

According to the present invention, the frame D of the wind shield B (which commonly engages both ends and the upper margin of the glass, leaving the lower margin free), may be of any usual construction at its end members *c c*, but is of special construction in its top member *d*. This top frame member is made hollow to form a guide or runway within it for the slide or wiper carrier *e* which carries the wiper *f*, which latter is of any suitable construction (such as those shown in my previous patent and application) for moving over and wiping the front surface of the wind shield. The cylinder *g* is a tube arranged parallel to, and as nearly as possible on the same level as, the frame member *d*, and suitably connected thereto at opposite ends. The piston *h* moves in the cylinder *g* and is connected at its opposite ends with the connectors *i* which may pass over pulleys *j j* at opposite ends precisely as in my said pending application, except that the pulleys, instead of being arranged in a vertical plane on horizontal axes, are arranged in a horizontal plane on vertical axes. The pulleys are enclosed in end casings *k k*, which serve to house them, and may also serve as the end connecting means between the cylinder and hollow frame *d*. In order that these boxes shall not appear to project in an unsightly manner beyond the upper corners of the wind shield, it is desirable to arrange them directly over the end frame members *c c*. The valve box *m* is best located at one end, as shown in Fig. 5, where it enters the space between the cylinder *g* and frame *d*. In this position it is as inconspicuous as possible, it being desirable that the presence of the cylinder *g* and valve box *m* should be as nearly unnoticeable as is possible, consistent with their performing their required functions as members of the cleaner. The valve mechanism may be substantially as shown in my said patent or application, its particular construction being immaterial to the present invention. To show an operative mechanism I have illustrated in Fig. 7, in a somewhat diagrammatic manner, a suitable arrangement of valve mechanism, making reference, however, to my said application for a more full understanding of the detailed construction of the practically preferred valves and operating means. Referring to Fig. 7, the valve box *m* is connected by a suction conduit *n*, through a flexible tube, with the intake manifold of the engine; and by an opening *o* with a duct communicating with one end of the cylinder, and by an opening *p* with a duct communicating with the other end of the cylinder. These communications are best made by a short tube *q* from *o* to the interior of one of the pulley boxes *k*, and by a longer tube *q'* to the interior of the opposite pulley box, all as shown in my said application. The valves shown are tappets 10, 11, 12, 13, mounted on rods or stems 14, 15, operated by a rock lever 16 through loose connections; the lever 16 is a three-armed lever, the lower arm 17 of which carries a pin 18 which is moved at opposite ends by the movements of the carrier slide *e*. It is best to provide the lever 16 with a spring tending to throw it from its mid-position to either side position, in order that when the tappet action has carried it past the middle, it will then quickly snap over to the extreme position and thereby shift the valves.

Merely as an example of a suitable spring arrangement for this purpose, a leaf spring 19 is shown acting through a toggle pin or plate 20, the opposite ends of which are engaged in notches at the end of the spring and in the hub portion of the lever 16 respectively; the toggle piece 20 being brought into alignment with the arm 17 when the lever 16 is at midstroke, so that when either side thereof its oblique stroke acts to press the lever toward extreme position. The valve seats and passages are so clearly shown as to require no description; suffice it to say that the upper part of the valve box being open to the atmosphere, as through an opening *r*, air may enter through the open valve 12 or 13 to one end of the cylinder, while from the other end it passes through the open valve 10 or 11 to the suction passage *n*, thus communicating suction to one end of the cylinder to move the piston toward that end. At the prescribed end of the stroke of the slide *e*, the pin 18 is struck to reverse the position of lever 16, whereupon these conditions are reversed and the piston is caused to travel in the contrary direction. The reversing means is best provided by a tappet bar or plate *s* which at one end, *s'*, has a projection which is struck by the slide *e*, and at the other end may have a similar projection or may have a tappet projection applicable to it at any point to be so struck by the slide, so that the movement may be reversed at any point in the travel of the wiper. The tappet bar *s* may have a slot connection with the pin 18, to permit the valve mechanism to complete an initiated movement ahead of the bar.

The special construction of the frame member *d* is best shown in Fig. 6. The duties of this frame member are to enclose and guide the sliding carrier *e*, and to confine the upright edge of the glass plate of the wind shield. It also may advantageously enclose and guide the tappet bar *s*. These functions are well performed by the construction shown, wherein the frame member *d* is bent up of a sheet of plate metal of suitable thickness, forming V portions *t t'* at top and bottom, and having overlapping parallel edge portions of the metal, *u* and *u'*, separated to form between them a space or slot *v*. The V portions *t t'* form on the interior of the frame ribs which engage V grooves in the slide *e* and serve to guide it. The outer edge member $u'$, by projecting down from the top and partly overlapping the inner edge member $u$, serves to shed rain from the interior of the hollow bar. The space or slot $v$ between them affords an opening through which an arm $e'$ attached to or forming part of the carrier slide $e$ may project outwardly sufficiently far to serve for the attachment of the wiper. The lower V portion $t'$ affords a groove on the under side of the hollow bar $d$, which receives and holds in place the upper edge of the glass. The slide $e$ need not occupy the entire width of the interior of the hollow bar, thus leaving space in which the tappet slide $s$ may be guided.

The entire structure provided by the present invention constitutes a wind shield frame and wiper, the stationary elements of the latter being substantially integral with the frame, so as to present as compact and sightly a structure, and render the wind shield cleaner as nearly invisible, as possible.

If desired, the special upper wind shield frame member, cylinder, and other parts of the cleaner, may be made readily detachable as a unit from the side frame members, as by the removal of fastening bolts $x$, Fig. 2, and an ordinary upper frame member may be substituted therefor. This provides for the quick removal of the cleaner, when its use is not desired, or for the purpose of repairs, without throwing the wind shield out of use.

The construction described may be modified in many respects without departing from what is essential to the invention. While it is desirable to make the frame member $d$ hollow and cause the slide $e$ to travel within it, this is not strictly essential, it being merely desirable to conceal as far as possible the movements of the slide $e$ and the metal tapes $i$. While ordinarily it is preferable to have the cylinder $g$ arranged behind and on the same level with the frame member $d$, yet in other cases it may be preferable to mount the cylinder above this member, as shown, for example, in Fig. 8, where the slide $e$ is arranged horizontally to make the construction as compact as possible.

I claim as my invention:—

1. A combined wind shield and wind shield cleaner comprising a wind shield sash, a wiper carrier and means for automatically reciprocating said carrier, one structural element of said sash being tubular and serving as a hollow guideway through which said carrier is reciprocated and said carrier reciprocating means comprising a cylinder permanently attached to the tubular element of said sash in close parallelism therewith.

2. A combined wind shield and wind shield cleaner comprising a wind shield sash one of the elements of which is a tubular structure having parallel internal runways, a wiper carrier, and means for reciprocating said carrier through said structure along said runways, said sash element having a reentrant portion serving as one of said runways and also providing a groove to receive the edge of the transparent element of the wind shield.

3. A sash for a combined wind shield and wind shield cleaner, one element of said sash comprising a horizontally disposed hollow structure having internal wiper carrier runways extending lengthwise therethrough and a longitudinally disposed slot parallel with said runways and of approximately equal length, the walls of said structure adjoining said slot comprising an upper portion in overhanging relation with respect to a lower portion so as to serve as a watershed.

4. A wind shield having an upper frame member and end members, the upper member being hollow to receive within it a wiper carrier slide, a cylinder mounted parallel with said upper member, and pulley boxes at the junction of the upper and end members connecting the ends of the upper member with the ends of said cylinder.

5. A wind shield, the upper frame member of which is hollow, a cylinder mounted adjacent to and parallel with said member and connected thereto at its ends, a valve box and valve mechanism mounted between the two, a piston in said cylinder, a wiper carrier slide in said hollow member, flexible connectors between said piston and slide, and a tappet bar extending longitudinally of said hollow member and coacting with the slide and valve mechanism for reversing the latter at each end of the stroke of the slide.

In witness whereof, I have hereunto signed my name.

JOSEPH DEMAND.